United States Patent [19]

Bose et al.

[11] 4,448,852

[45] * May 15, 1984

[54] HOMOGENEOUS LOW MELTING POINT COPPER BASED ALLOYS

[75] Inventors: Debasis Bose, Randolph; Amitava Datta, Morris Township, Morris County; Nicholas J. DeCristofaro, Chatham, all of N.J.

[73] Assignee: Allied Corporation, Morris Township, Morris County, N.J.

[*] Notice: The portion of the term of this patent subsequent to May 15, 2001 has been disclaimed.

[21] Appl. No.: 488,858

[22] Filed: Apr. 26, 1983

Related U.S. Application Data

[63] Continuation-in-part of Ser. No. 420,550, Sep. 20, 1982.

[51] Int. Cl.³ .................... C22C 9/00; B23K 35/30
[52] U.S. Cl. .................... 428/606; 420/473; 420/485; 164/463; 148/403; 228/263.18
[58] Field of Search .............. 148/403; 428/606; 420/457, 470, 473, 485; 228/263.11, 263.18; 164/462, 463

[56] References Cited

U.S. PATENT DOCUMENTS

| Re. 30,854 | 1/1982 | Plewes et al. | 420/470 |
| Re. 31,180 | 3/1983 | Plewes | 420/470 |
| 2,117,106 | 5/1938 | Silliman | 420/473 |
| 2,755,182 | 7/1956 | Cape | 420/485 |
| 2,946,678 | 7/1960 | Rou | 420/457 |
| 4,009,027 | 2/1977 | Naidich et al. | 420/473 |
| 4,071,358 | 1/1978 | Kawakatsu | 420/473 |
| 4,209,570 | 6/1980 | DeCristofaro et al. | 148/403 |
| 4,388,270 | 6/1983 | Stavish et al. | 420/473 |

FOREIGN PATENT DOCUMENTS

| 235657 | 5/1959 | Australia | 420/483 |
| 52-4451 | 1/1977 | Japan | 420/473 |
| 52-11124 | 1/1977 | Japan | 420/473 |
| 56-265 | 1/1981 | Japan | 420/485 |
| 56-90947 | 7/1981 | Japan | 420/473 |
| 244624 | 5/1969 | U.S.S.R. | 420/473 |

*Primary Examiner*—L. Dewayne Rutledge
*Assistant Examiner*—John J. Zimmerman
*Attorney, Agent, or Firm*—Ernest D. Buff; Paul Yee

[57] ABSTRACT

A copper based low melting point metal alloy composition consists essentially of about 2.5 to 11 atom percent tin, about 0 to 12 atom percent nickel and about 11 to 15 atom percent boron, the balance being essentially copper and incidental impurities. The composition is such that the total of copper and tin ranges from about 85 to 89 atom percent.

16 Claims, No Drawings

HOMOGENEOUS LOW MELTING POINT COPPER BASED ALLOYS

CROSS-REFERENCE UNDER RELATED APPLICATIONS

This application is a continuation-in-part of U.S. patent application Ser. No. 420,550, filed Sept. 20, 1982.

BACKGROUND OF THE INVENTION

1. Field of the Invention

This invention relates to copper based metal alloys and more particularly to a homogeneous, ductile brazing material useful for brazing metal articles such as those composed of copper and copper alloys.

2. Description of the Prior Art

Brazing is a process of joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, leak-tight joint is formed. Filler metals used are commonly is powder, wire or foil form depending on the type of application. Foil form provides the advantage of preplacing the filler metal in the joint area, thus permitting brazing of complex shapes with minimum rejection.

The brazing alloys suitable for use with copper and copper alloys, designated AWS BAg are well known compositions. These alloys contain substantial amounts of the precious metal silver (19 to 86 weight percent) and hence are expensive. Most of the AWS BAg compositions are fabricated to a foil form through a lengthy sequence of rolling and annealing, thereby incurring substantial processing cost.

Ductile glassy metal alloys have been disclosed in U.S. Pat. No. 3,856,513, issued Dec. 24, 1974 to H. S. Chen et al. These alloys include compositions having the formula $T_iX_j$, where T is at least one transition metal and X is an element selected from the group consisting of phosphorus, boron, carbon, aluminum, silicon, tin, germanium, indium, beryllium and antimony, "i" ranges from about 70 to about 87 atom percent and "j" ranges from about 13 to 30 atom percent. Such materials are conveniently prepared in powder, wire or foil form by rapid quenching from the melt using processing techniques that are now well-known in the art. However, no liquid-quenched glassy metal alloys of the family $T_iX_j$ described above, containing copper as the principal transition metal have been reported. Chen et al. report only one copper containing composition (e.g. $Pd_{77.5}Cu_6Si_{16.5}$) in U.S. Pat. No. 3,856,513. H. Suto and H. Ishikawa, Trans. Japan Inst. of Metals, V. 17, 1976, p. 596, report fabrication of glassy Cu-Si by vapor deposition.

There remains a need in the art for a homogeneous brazing material for joining copper and copper alloys that is free of precious metals and can be produced in foil, powder or wire form.

SUMMARY OF THE INVENTION

The present invention provides a low melting point copper based metal alloy composition. Generally stated the composition consists essentially of about 2.5 to 11 atom percent Sn, about 0 to 12 atom percent Ni, about 11 to 15 atom percent B, balance being essentially Cu and incidental impurities. The composition being such that the total of Cu, Ni and Sn ranges from about 85 to 89 atom percent. Preferably, the metal alloy composition has at least partially glassy structure.

In addition, the invention provides a homogeneous, ductile brazing foil having a composition consisting essentially of about 2.5 to 11 atom percent Sn, about 0 to 12 atom percent Ni, about 11 to 15 atom percent B, balance being essentially Cu and incidental impurities with total of Cu, Ni and Sn ranging from about 85 to 89 atom percent. Preferably the brazing foil of this invention is at least partially glassy and either consists essentially of about 75 to 78 atom percent copper, about 10 to 11 atom percent Sn and about 11 to 13 atom percent B, consists essentially of about 66 to 71 atom percent copper, about 10 to 11 atom percent Sn, about 9 to 11 atom percent Ni and about 10 to 12 atom percent B.

It has been found that the addition of Sn markedly increases the strength of joints brazed with alloys of this invention. The presence of the metalloid component, B, serves to depress the melting point of the Cu constituent and provides the alloy with self-fluxing capability.

The homogeneous brazing foil of the invention is fabricated by a process which comprises forming a melt of the composition and quenching the melt on a rotating quench wheel at a rate of least about $10^5°$ C./sec.

Further, there is provided in accordance with the invention, an improved process for joining two or more metal parts by brazing. The process comprises:

(a) interposing a filler metal between the metal parts to form an assembly, the filler metal having a melting temperature less than that of any of the metal parts;

(b) heating the assembly to at least the melting temperature of the filler metal; and (c) cooling the assembly.

The improvement comprises employing, as the filler metal, a homogeneous, copper based foil that has the composition given above.

The filler metal foil is easily fabricable as homogeneous, ductile ribbon, which is useful for brazing as cast. Advantageously, the copper based metal foil can be stamped into complex shapes to provide braze preforms.

Advantageously, the homogeneous, ductile brazing foil of the invention can be placed inside the joint prior to the brazing operation. Use of the homogeneous, ductile copper based foil provided by this invention also permits brazing to be accomplished by processes such as dip brazing in molten salts, which are not readily accomplished with powder or rod-type fillers.

DETAILED DESCRIPTION OF THE INVENTION

Glassy metal alloys are formed by cooling a melt of the desired composition at a rate of at least about $10^5°$ C./sec. A variety of rapid quenching techniques, well known to the glassy metal alloy art, are available for producing glassy metal powders, wires, ribbon and sheet. Typically, a particular composition is selected, powders or granules of the requisite elements in the desired portions are melted and homogenized, and the molten alloy is rapidly quenched on a chill surface, such as a rapidly rotating cylinder, or in a suitable fluid medium, such as water.

Copper based brazing alloys have been fabricated by processes such as those described above.

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metals being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with the invention, a homogeneous, ductile brazing material in foil form is provided. The brazing foils include compositions ranging from about 2.5 to 11 atom percent Sn, about 10 to 12 atom percent Ni, about 11 to 15 atom percent B, balance being essentially Cu and incidental impurities.

These compositions are compatible with copper and copper-based alloys and are particularly suited for joining these materials.

By homogeneous is meant that the foil, as produced, is of substantially uniform composition in all dimensions. By ductile is meant that foil can be bent to a round radius as small as ten times the foil thickness without fracture.

Examples of brazing alloy compositions within the scope of the invention are set forth in Table I.

Within the broad range disclosed above, there is a preferred composition range that is compatible with and permits brazing of copper and a wide range of copper alloys under a wide range of atmospheric conditions. Such preferred composition range permits copper and copper alloys to be joined under substantially all brazing conditions. Two specially preferred alloy compositions of the present invention consists essentially of (1) about 77 atom percent Cu, about 11 atom percent Sn and about 12 atom percent B; and (2) about 67.1 atom percent Cu, about 10.7 atom percent Ni, about 10.6 atom percent Sn and about 11.6 atom percent B.

Further, in accordance with the invention, an improved process for joining two or more metal parts is disclosed. The process comprises:

(a) interposing a filler metal between the metal parts to form an assembly, the filler metal having a melting temperature less than that of any of the metal parts;

(b) heating the assembly to at least the melting temperature of the filler metal; and (c) cooling the assembly.

The improvement comprises employing, as the filler metal, at least one homogeneous, copper based foil having a composition within the ranges given above.

The brazing foils of the invention are prepared from the melt in the same manner as glassy metal foils. Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys should be at least 50% glassy to be sufficiently ductile to permit subsequent handling, such as stamping complex shapes from ribbons of the alloys. Preferably, the glassy metal alloys should be totally glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials may also be ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 0.0010 to 0.0025 inch (25.4 to 63.5 $\mu$m) thick, which is also the desired spacing between bodies being brazed. Such spacing maximizes the strength of the braze joint. Thinner foils stacked to form greater thicknesses may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

The brazing foils of the invention are also superior to various powder brazes of the same composition in providing good braze joints. This is probably due to the ability to apply the brazing foil where the braze is required, rather than depending on capillarity to transport braze filler metal from the edge of surfaces to be brazed.

EXAMPLE 1

Ribbons about 2.5 to 6.5 mm (about 0.10 to 0.25 inch) wide and about 25 to 60 $\mu$m (about 0.0010 to 0.0025 inch) thick were formed by squirting a melt of the particular composition by overpressure of argon onto a rapidly rotating copper chill wheel (surface speed about 3000 to 6000 ft/min). Metastable, homogeneous alloy ribbons having at least partially glassy atomic structure were produced and the compositions of the ribbons are set forth in Table I.

TABLE 1

| Sample No. | | Cu | Sn | Ni | B |
|---|---|---|---|---|---|
| 1 | atom % | 86.5 | 2.5 | — | 11.0 |
|   | wt. % | 93.0 | 5.0 | — | 2.0 |
| 2 | atom % | 77.0 | 11.0 | — | 12.0 |
|   | wt. % | 77.0 | 21.0 | — | 2.0 |
| 3 | atom % | 74.0 | 11.0 | — | 15.0 |
|   | wt. % | 76.0 | 21.0 | — | 3.0 |
| 4 | atom % | 67.1 | 10.6 | 10.7 | 11.6 |
|   | wt. % | 68 | 10 | 20 | 2 |

EXAMPLE 2

The liquidus and solidus temperatures, $T_L$ and $T_S$ of the selected compositions (atom %) $Cu_{77}Sn_{11}B_{12}$ and $Cu_{76.1}Sn_{10.6}Ni_{10.7}B_{11.6}$ were determined by Differential Thermal Analysis (DTA) techniques. The temperatures are set forth in Table II.

TABLE 2

| Sample No. | | Composition | $T_L$ °C.(°F.) | $T_S$ °C.(°F.) |
|---|---|---|---|---|
| 2 | atom % | $Cu_{77}Sn_{11}B_{12}$ | 898 (1648) | 784 (1443) |

TABLE 2-continued

| Sample No. | Composition | $T_L$ °C.(°F.) | $T_S$ °C.(°F.) |
|---|---|---|---|
| 4 atom % | $Cu_{67.1}Sn_{10.6}Ni_{10.7}B_{11.6}$ | 850 (1562) | — — |

EXAMPLE 3

Lap shear test specimens were prepared according to the AWS C 3.2 "Standard Method for Evaluating the Strength of Brazed Joints." Copper sheet, 3.175 mm (0.125") thick was used as the base metal. Ribbons of the selected composition (atom %) $Cu_{77}Sn_{11}B_{12}$ having dimensions of about 25.4 μm to 38.1 μm (0.001"–0.0015") thick and about 6.35 mm (0.25") wide were used as the filler metal. Brazed joints were of the lap type with the lap dimension carefully controlled to 6.35 mm (0.25") and 12.7 mm (0.5"). Specimens were then degreased in acetone and rinsed with alcohol. The mating surfaces of the blanks were fluxed using boric acid. Lap joints containing the selected brazing ribbon of the invention was then assembled by laying ribbons side by side to cover the entire length of the lap joint. Specimens were then clamped and torch brazed using osyacetylene flame with 8 psi oxygen and 8 psi acetylene pressure. Brazed specimens were then air cooled to room temperature and the flux residue was removed by wire brushing.

For comparative purposes identical joints were prepared using 25.4 μm (0.001") thick BCuP-5 foil and 0.157 cm (0.064") dia BAg-1 and BAg-2 rod. The nominal compositions and brazing temperature ranges of these filler metals are given in Table IIIA and IIIB, respectively.

TABLE IIIA

| Alloy | | Ag | Cu | P | Zn | Cd |
|---|---|---|---|---|---|---|
| BCuP-5 | atom % | 8.92 | 80.73 | 10.35 | — | — |
|  | wt. % | 15 | 80 | 5 | — | — |
| BAg-1 | atom % | 37.53 | 21.24 | — | 22.02 | 19.21 |
|  | wt. % | 45 | 15 | — | 16 | 24 |
| BAg-2 | atom % | 26.71 | 33.67 | — | 26.44 | 13.18 |
|  | wt. % | 35 | 26 | — | 21 | 18 |

TABLE IIIB

| Alloy | Temp. °C. (°F.) |
|---|---|
| BCuP-5 | 704–816 (1300–1500) |
| BAg-1 | 618–760 (1145–1400) |
| BAg-2 | 635–760 (1175–1400) |

When the applied filler metal was in rod form (BAg-1 and BAg-2 alloys), a clearance of 38.1 m (0.0015") was kept between the mating surfaces of the blank by placing stainless steel spacers at the two edges. The assembly was then heated to the brazing temperature range of these alloys and the filler metal was applied to one side only. The molten filler metal was then drawn by capillary action and covered the entire mating surfaces. Mechanical properties of brazed joints having an overlap of 12.7 mm (0.5 inch) are listed in Table IVA, while mechanical properties of brazed joints having an overlap of 6.35 mm (0.25 inch) are set forth in Table IVB.

TABLE IVA

| Alloy | Shear Strength Mpa (psi) | Tensile Strength Mpa (psi) | Area of Failure |
|---|---|---|---|
| BCuP-5 | 44 (6,320) | 174 (25,280) | Joint |
| BAg-1 | 41 (6,660) | 184 (26,640) | Joint |
| BAg-2 | 43 (6,240) | 172 (24,960) | Joint |
| Sample 2 | 46 (6,610) | 182 (26,440) | Base Metal |

TABLE IVB

| Alloy | Shear Strength Mpa (psi) | Tensile Strength Mpa (psi) | Area of Failure |
|---|---|---|---|
| BCuP-5 | 93 (13,440) | 185 (26,880) | Joint |
| BAg-1 | 72 (10,440) | 144 (20,880) | Joint |
| BAg-2 | 62 (9,040) | 125 (18,080) | Joint |
| Sample 2 | 94 (13,660) | 188 (27,320) | Base Metal |

At overlaps of both 12.7 mm (0.5 inch) and 6.35 mm (0.25 inch), the selected alloy of the present invention having the composition (atom percent) $Cu_{77}Sn_{11}B_{12}$ failed in the base metal, indicating the strength of the brazed joint exceeded that of the base metal. On the contrary, identical brazements made with the silver containing alloys BCuP-5, BAg-1 and BAg-2 failed in the brazed joints at overlaps of 12.7 mm (0.5 inch) and 6.35 mm (0.25 inch). Therefore, the selected alloy of the present invention having the composition (atom percent) $Cu_{77}Sn_{11}B_{12}$ produced stronger joint compared to the silver containing alloys BCuP-5, BAg-1 and BAg-2.

Lap shear test specimens were prepared according to the AWS C 3.2 "Standard Method for Evaluating the Strength of Brazed Joints." Copper sheet, 3.175 (0.125") thick was used as the base metal. Ribbons of the selected composition (atom %) $Cu_{67.1}Sn_{10.6}Ni_{10.7}B_{11.6}$ dimensions of about 25.4 μm to 38.1 m (0.001"–0.0015") thick and about 6.35 mm (0.25") wide were used as the filler metal. Brazed joints were of the lap type with the lap dimension carefully controlled to 15.88 mm (0.6250"). Specimens were then degreased in acetone and rinsed with alcohol. The mating surfaces of the blanks were fluxed using boric acid. Lap joints containing the selected brazing ribbon of the invention was then assembled by laying ribbons side by side to cover the entire length of the lap joint. Specimens were then clamped and torch brazed using oxyacetylene flame with 8 psi oxygen and 8 psi acetylene pressure. Brazed specimens were then air cooled to room temperature and the flux residue was removed by wire brushing.

For comparative purposes identical joints were prepared using 0.157 cm (0.064") dia BAg-1 rod. The nominal compositions and brazing temperature ranges of this filler metal was given in Table IIIA and IIIB, respectively. When the applied filler metal was in rod form (BAg-1 alloy), a clearance of 38.1 μm (0.0015") was kept between the mating surfaces of the blank by placing stainless steel spacers at the two edges. The assembly was then heated to the brazing temperature ranges of these alloys and the filler metal was applied to one side only. The molten filler metal was then drawn by capillary action and covered the entire mating surfaces. Mechanical properties of brazed joints are given in Table V below.

TABLE V

| Alloy | Shear Strength Mpa (psi) | Tensile Strength Mpa (psi) | Area of Failure |
|---|---|---|---|
| Sample 4 | 53 (7700) | 212 (30,800) | Base Metal |
|  | 51 (7409) | 208 (30,218) | Base |

TABLE V-continued

| Alloy | Shear Strength Mpa (psi) | Tensile Strength Mpa (psi) | Area of Failure |
| --- | --- | --- | --- |
| | | | Metal |

The joints made with filler metals composed of Sample 4 and BAg-1, respectively, failed in the base metal, indicating that the strengths of joints formed using, as filler metals, Sample 4 and BAg-1 are comparable to each other.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A metal alloy having a composition consisting essentially of about 2.5 to 11 atom percent tin, about 0 to 12 atom percent nickel and about 11 to 15 atom percent boron, the balance being copper and incidental impurities and the total of copper and tin ranging from about 85 to 89 atom percent structure.

2. A metal alloy composition as recited in claim 1, which has at least about 50% glassy.

3. A metal alloy composition as recited in claim 1, which has at least partially glassy structure.

4. A metal alloy as recited in claim 1, having a composition consisting essentially of about 10 to 11 atom percent tin, about 10 to 12 atom percent nickel, about 11 to 13 atom percent boron and about 75 to 78 atom percent copper.

5. A metal alloy composition as recited in claim 1, having a composition consisting essentially of about 77 atom percent copper, about 11 atom percent tin and about 12 atom percent boron.

6. A metal alloy composition as recited in claim 1, consisting essentially of about 67.1 atom percent copper, about 10.7 atom percent nickel, about 10.6 atom percent tin and about 11.6 atom percent boron.

7. A homogeneous brazing foil having a composition consisting essentially of about 2.5 to 11 atom percent tin, about 0 to 12 atom percent nickel, and about 11 to 15 atom percent boron, the balance being copper and incidental impurities and the total of copper and tin ranging from about 85 to 89 atom percent.

8. A brazing foil as recited in claim 7, said foil having a thickness ranging from about 0.0010 to 0.0025 inch.

9. A brazing foil as recited in claim 7, said foil being ductile and having at least partially glassy structure.

10. A brazing foil as recited in claim 9, said foil having at least about 50% glassy structure.

11. A brazing foil as recited in claim 9, said foil having at least partially glassy structure.

12. A process for fabricating homogeneous ductile foil having a composition consisting essentially of 2.5 to 11 atom percent tin, about 0 to 12 atom percent nickel, and 11 to 15 atom percent boron, the balance being copper and incidental impurities and the total of copper and tin ranging from about 85 to 95 atom percent, which process comprises forming a melt of the composition and quenching the melt on a rotating chill block at a rate of at least about $10^5$ C./sec.

13. The process of claim 12 in which the foil has a composition consisting essentially of about 10 to 11 atom percent tin, about 11 to 13 atom percent boron and about 75 to 78 atom percent copper.

14. The process of claim 12 in which said foil has a thickness ranging from 0.0010 to 0.0025 inch.

15. A product produced by the process of claim 12.

16. The process of claim 12 in which the foil has a composition consisting essentially of about 67.1 atom percent copper, about 10.7 atom percent nickel, about 10.6 atom percent tin and about 11.6 atom percent boron.

* * * * *